(12) United States Patent
Metius et al.

(10) Patent No.: US 6,602,317 B2
(45) Date of Patent: *Aug. 5, 2003

(54) METHOD AND APPARATUS FOR CONTROLLING TEMPERATURE UNIFORMITY OF THE BURDEN IN A DIRECT REDUCTION SHAFT FURNACE

(75) Inventors: Gary E. Metius, Charlotte, NC (US); Stephen C. Montague, Midland, NC (US); Russell Kakaley, Charlotte, NC (US); Brian W. Voelker, Concord, NC (US); Russell Eugene Bailey, Ankana (TR)

(73) Assignee: Midrex International, B.V. Rotterdam, Zurich Branch, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/944,675

(22) Filed: Aug. 30, 2001

(65) Prior Publication Data

US 2003/0041691 A1 Mar. 6, 2003

Related U.S. Application Data

(63) Continuation-in-part of application No. 09/781,816, filed on Feb. 12, 2001, now Pat. No. 6,506,230, which is a continuation-in-part of application No. 09/456,111, filed on Dec. 7, 1999, now Pat. No. 6,524,356, which is a continuation-in-part of application No. 08/924,686, filed on Sep. 5, 1997, now Pat. No. 5,997,596.

(60) Provisional application No. 60/181,945, filed on Feb. 11, 2000.

(51) Int. Cl.[7] ............................................. C21B 13/02
(52) U.S. Cl. .............................. 75/380; 75/496; 266/87; 266/186

(58) Field of Search ..................... 75/496, 380; 266/87, 266/156, 186

(56) References Cited

U.S. PATENT DOCUMENTS 6,395,055 B1 * 5/2002 Bueno et al. ................. 75/496
6,506,230 B2 * 1/2003 Montague et al. ............ 75/381

OTHER PUBLICATIONS

Montague et al Jun. 21, 2001 Patent Application Publication US 2001/0003930 A1.*

* cited by examiner

*Primary Examiner*—Melvyn Andrews
(74) *Attorney, Agent, or Firm*—Dougherty, Clements & Hofer

(57) ABSTRACT

A method and apparatus for increasing hydrocarbons to a direct reduction shaft furnace while controlling the temperature uniformity of the center portion of the iron burden wherein the hydrocarbon gases used in direct reduction may be preheated, which increases the temperature of the hydrocarbon gases, and therefore increases the resultant temperature of the upflowing gases as it rises from the lower section of the furnace into the center of the burden. Alternatively, a portion of the upflowing gas may be removed before it enters the reduction zone of the furnace. The removed upflowing gas, known as hot bleed gas, may be ducted to the top gas scrubber of the furnace or may be mixed with the main reducing gas stream of the furnace for reintroduction to the furnace. Alternatively, hot reducing gas may be directly injected into the center portion of the burden, offsetting the cooling effect of the upflowing gas. The center injected hot reducing gas may be split off from the main reducing gas stream or may be generated by a partial oxidation reactor.

19 Claims, 6 Drawing Sheets

METHOD AND APPARATUS FOR CONTROLLING TEMPERATURE UNIFORMITY OF THE BURDEN IN A DIRECT REDUCTION SHAFT FURNACE

CROSS REFERENCE TO RELATED APPLICATIONS

This application is a continuation-in-part of and claims priority from co-pending U.S. patent application Ser. No. 09/781,816, filed on Feb. 12, 2001, now U.S. Pat. No. 6,506,230 which is a continuation in part of application Ser. No. 09/456,111, filed on Dec. 7, 1999 now U.S. Pat. No. 6,524,356, which is a continuation in part of application Ser. No. 08/924,686, filed on Sep. 5, 1997, now U.S. Pat. No. 5,997 596 and which is a non provisional of provisional application No. 60/181,945, filed on Feb. 11, 2000.

FIELD OF THE INVENTION

The present invention relates to a method and apparatus for controlling the temperature during the direct reduction of iron. More particularly, the present invention relates a method and apparatus which controls the temperature uniformity of the center portion of the iron burden in a direct reduction shaft furnace thereby allowing a higher amount of hydrocarbons to be used throughout the reduction process.

BACKGROUND OF THE INVENTION

The production of direct reduced iron in both hot and cold discharge plants occurs in a vertical shaft furnace and involves reduction of iron ore or iron oxide as it moves downwardly in a reduction zone of a vertical shaft furnace through which is passed a suitable hot reducing gas, known as bustle gas. Bustle gas, which is principally composed of carbon monoxide and hydrogen, is introduced to the shaft furnace at temperatures in the range of about 700° C. to about 1100° C. The ore is charged at the top of the furnace and caused to flow downwardly through the reduction zone wherein it is reduced by heated reducing gas which flows upwardly through the furnace, after which the reduced ore flows into and downwardly through the transition zone to be carburized if desired. For cool discharge plants, after passing through the reduction zone, the ore is cooled in a cooling zone through which is passed a gaseous coolant at a temperature below about 200° C. Typically, in a cool discharge furnace, both the reducing gas and cooling gas are re-circulated, optionally in closed loops, to which streams of fresh (i.e. "make-up") reducing gas are added and from which streams of spent gas are removed.

The reducing gas being fed to the reduction zone of the furnace is typically at an elevated temperature, which is required by reaction kinetics. The reducing gas is caused to contact the downwardly moving iron ore to reduce the iron oxides therein according to the following basic reactions:

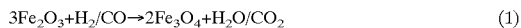

$3Fe_2O_3 + H_2/CO \rightarrow 2Fe_3O_4 + H_2O/CO_2$ (1)

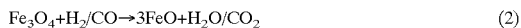

$Fe_3O_4 + H_2/CO \rightarrow 3FeO + H_2O/CO_2$ (2)

$FeO + H_2/CO \rightarrow Fe + H_2O/CO_2$ (3)

In the production of direct reduced iron (DRI), it is desirable to increase the product carburization and to increase in-situ reforming in the lower portion of both hot and cold direct reduction furnaces by injecting hydrocarbons. This is a proven means to increase the productivity of direct reduction furnaces without adding new equipment to increase reducing gas capacity. This is also a proven means to increase product carbon. The hydrocarbons react with the hot DRI, depositing carbon and liberating hydrogen gas. However, the reaction of the hydrocarbons to form carbon and hydrogen is endothermic. Thus, the newly formed cool hydrogen gas flows upward through the center of the furnace (called upflow), cooling the descending iron material. Because of temperature considerations, the amount of hydrocarbons that can be added to the lower portion of the furnace is limited by either low center bed temperature or low product discharge temperature.

As more hydrocarbons are added to the lower portion of the furnace, cooled hydrogen gas is produced which rises into the reduction zone and the center bed temperature decreases, thus reducing reaction kinetics. At a temperature of about 625–650° C., the average product metallization begins to drop because the material in the center of the furnace is not properly reduced/metallized. Also, in hot discharge furnaces, product discharge temperature must be maintained above approximately 700° C. for proper subsequent briquetting. For hot transport applications, higher discharge temperature of the DRI makes more sensible heat available in the melter, thus reducing the power required for melting. As hydrocarbons are added to the lower portion of a hot discharge furnace, it is possible that the average product temperature will be below 700° C. before the center bed temperature reaches the point that metallization drops significantly.

To date, several techniques have been used to allow higher flows of hydrocarbons to the furnace lower cone, to extend the limits noted above, and to control the temperature of the burden. For cold discharge furnaces, some examples of techniques being used are cooling zone bleed and simplified center injection. However, prior art center injection techniques lack means to control or measure flow into the center injection system and lack means to force flow into the center injection line.

Another technique for temperature and carbon control which has been employed is the injecting of cold natural gas into the direct reduction furnace. The natural gas mixes with other gases already present in the furnace and is heated by the gas and solids already in the furnace. As the hydrocarbons in the natural gas are heated they crack to form $H_2$ and deposit carbon on the product or they reform with $H_2O$ and $CO_2$ in the gas furnace to make additional $H_2$ and CO. The present limitation on the injection of natural gas is temperature. As more cold natural gas is injected, the center bed temperature decreases, which decreases the rate of reaction kinetics. At low flow rates of the cold natural gas, the production benefit from additional reducing gases will outweigh the disadvantage from decreased reaction kinetics. But when the temperatures in the center bed decrease to a certain point, any further production benefit from additional reducing gases will be negated by the decrease in reaction kinetics. This limits the amount of natural gas that can be added to the furnace for in situ cracking and reforming.

What is therefore needed is a means and method for increasing the amount of hydrocarbon gas supplied to the transition zone and/or cooling section of a direct reduction furnace while maintaining the temperature of the central reaction zone of the direct reduction furnace at a temperature favorable to the direct reduction of iron.

SUMMARY OF THE INVENTION

The present invention provides a method and apparatus which controls the temperature uniformity of the center portion of the iron burden in a direct reduction shaft furnace thereby allowing a higher amount of hydrocarbons to be used in the cooling zone. The invention is an efficient improvement of existing methods, particularly, the Midrex method and apparatus for direct reduction of iron which is incorporated by reference herein. Typically, the center portion of iron bearing material in the burden of a direct reduction furnace is cooler than the rest of the burden due to upflowing gases which is injected into the lower cooling section of the furnace and rises upwardly into the center portion of the reducing section of the furnace. By increasing the temperature of the burden in the center portion of the furnace, the iron is reduced under much more favorable conditions. Thus, the present invention is advantageous to achieve the objects stated herein.

Disclosed herein are methods for heating the center region of the furnace, particularly the burden. In a first embodiment of the invention, a hydrocarbon gas used in direct reduction may be preheated, which increases the temperature of the upflowing gas as it flows upwardly into the center of the burden. Alternatively, a portion of the upflowing gas may be removed before it enters the reduction zone of the furnace. The removed upflowing gas, known as hot bleed gas, may be ducted to a top gas scrubber of the furnace or may be mixed with the main reducing gas stream of the furnace for reintroduction to the furnace. Alternatively, hot reducing gas may be directly injected into the center portion of the burden, offsetting the effect of the upflowing gases. The center injected hot reducing gas may be split off from the main reducing gas stream or may be generated by a partial oxidation reactor. Finally, it will be appreciated by those skilled in the art that the above noted embodiment may be employed individually or in combination depending on the DRI plant facility.

OBJECTS OF THE INVENTION

The principal object of the present invention is to provide a method and apparatus for controlling temperature uniformity in the burden of a direct reduction shaft furnace.

It is another object of the present invention to provide an apparatus and method which allows the use of higher quantities of hydrocarbons or other gases within the lower portion of both hot and cold discharge furnaces so that product carbon and/or in-situ reforming may be increased while the temperature within the center of the direct reduction furnace is maintained at a temperature favorable to the direct reduction of iron, thereby increasing the degree of carburization of the iron product without adversely affecting the metallization of the iron burden.

Another object of the present invention is to provide an apparatus and method for conserving energy in a direct reduction furnace by maintaining a uniform temperature throughout the burden.

Another object of the invention is to provide a method and apparatus for increasing the temperature of the center burden of a direct reduction furnace in order to offset the cooling effect caused by upflowing gases into the reduction zone of the furnace, and thereby increasing metallization of the burden.

Another object of the present invention is to provide control options to DR plant operators to allow significantly higher levels of hydrocarbon gas additions, while reducing the temperature variations across the burden.

BRIEF DESCRIPTION OF THE DRAWINGS

The foregoing and other objects will become more readily apparent by referring to the following detailed description and the appended drawings in which.

DETAILED DESCRIPTION

The present invention provides a method and apparatus which controls the temperature uniformity of the center portion of the iron burden in a direct reduction shaft furnace thereby allowing a higher amount of hydrocarbons to be used throughout the reduction process. The invention is an efficient improvement of existing methods, particularly, the Midrex process and apparatus for direct reduction of iron. The Midrex process and apparatus for direct reduction is disclosed in U.S. Pat. No. 3,748,120 entitled "Method of Reducing Iron Oxide to Metallic Iron," U.S. Pat. No. 3,749,386 entitled "Method for reducing Iron Oxides in a Gaseous Reduction Process," U.S. Pat. No. 3,764,123 entitled "Apparatus for reducing Iron Oxide to Metallic Iron," U.S. Pat. No. 3,816,101 entitled "Method for Reducing Iron Oxides in a Gaseous Reduction process," and U.S. Pat. No. 4,046,557 entitled "Method for producing Metallic Iron Particles," and is incorporated by reference herein.

Figure 1:
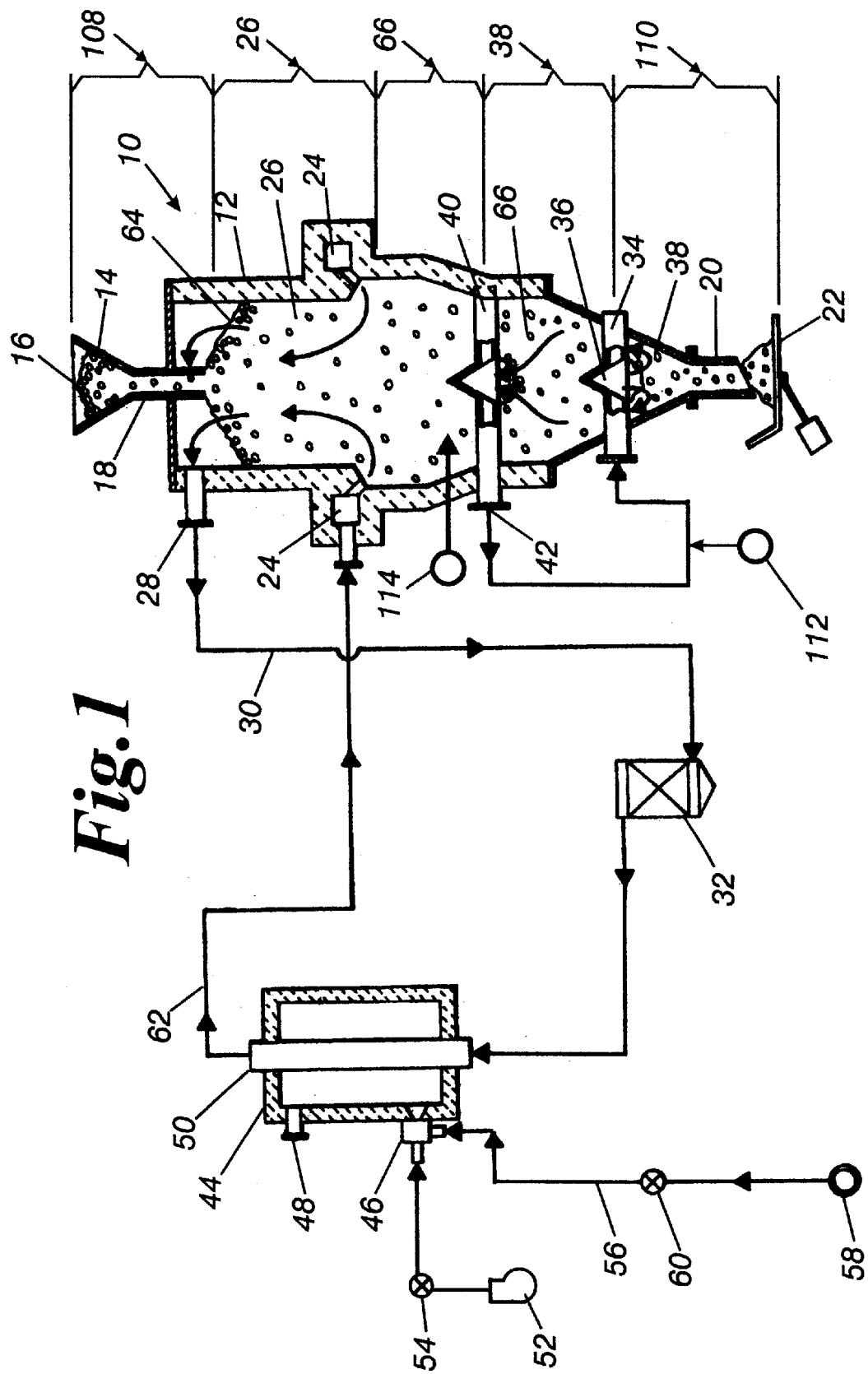
FIG. 1 is a schematic diagram showing an example of a typical direct reduction shaft furnace system for cool discharge product according to the Midrex process.

Referring to the drawings, and particularly FIG. 1, there is shown a schematic diagram of an example of a typical process and apparatus for the Midrex process direct reduction of metal oxides such as iron ore to which the present invention is applicable in cool discharge plants. It is to be understood that the present invention is applicable to both hot and cool DR plants, however, for the ease of visualization, a cool discharge plant is shown. The system 10 of FIG. 1 is a typical commercially available system used in many Direct Reduction Iron (DRI) plants. The system 10 includes a shaft furnace 12 having a refractory lining and generally having a feed hopper 14 from which iron ore 16 is fed to the furnace for reduction into iron using reformed gases. The furnace 12 typically has a charging zone 108, a reduction zone 26, a transition zone 66, a cooling zone 38, and a discharge zone 110. The iron ore 16 descends by gravity into the shaft furnace 12 from the hopper 14 through a pellet feed pipe 18. The pellet feed pipe 18 also serves as a gas seal pipe. At the bottom of the furnace 12 is a pellet discharge pipe 20 which also serves as a gas seal pipe. A pellet discharge device 22 of any conventional type is located below the discharge pipe 20 and receives metallic iron, thereby establishing gravitational descent of the burden through the furnace 12.

Near the upper portion of the furnace 12 is a bustle and tuyere system, indicated generally at 24, through which hot reducing gas is introduced to flow upwardly through a reduction zone 26 in counterflow relationship to the downwardly moving iron ore 16, as shown by the arrows, and after reacting with the burden exits from the furnace 12 through a gas off-take pipe 28 located at the top of the furnace 12. The hot reducing gas, flowing from the bustle system 24 to the off-take pipe 28, serves to heat the iron oxidel 6 and to reduce it to metallized iron. Throughout this Specification and appended claims, the term "metallized iron" is intended to include metal such as sponge iron, pellets, lumps, briquettes, DRI or other compacted forms of reduced metal and the like which contain at least 80% of their metal in the metallic state with the balance substantially in the form of metallic oxides. Metallized in this sense does not mean coated with metal, but nearly completely reduced to the metallic state.

The spent gas from off-take pipe 28 flows through a pipe 30 to a scrubber 32 which cools the spent gas and removes dust. Scrubber 32 can be of any conventional type used in the industry. After leaving the scrubber 32, the spent gas is ducted to a reformer 44. Thereafter it is recycled. In addition, cooled gas is introduced and re-circulated to a lower region of the furnace 12 via a cooling inlet pipe 34 which connects to a cooling gas introduction and distributing member 36 located within the furnace 12 and arranged to distribute the cool gas into the burden 16. Hydrocarbon gas is added to the cool gas from a fuel source 112 prior to a reintroduction into the burden 16. The cool gas introduced into the burden through distributing member 36 flows upward through a cooling zone 38 in counterflow relationship with downwardly moving burden 16 and disengages from the burden 16 at a cooling region off-take member 40 which connects to a cooling region off take pipe 42. The spent gas from the off-take pipe 42 is re-circulated and recycled.

The reformer 44 which generates hot reducing gas has fuel fired burners 46, a flue pipe 48 and a plurality of catalytic reformer tubes 50, only one being shown. Combustion air from a blower 52 is fed to the burners 46 through a flow regulating valve 54. Fuel is fed to the burners 46 through a pipe 56 from a fuel source 58 and flow regulating valves 60. The reformer 44 is connected to the bustle system 24 by a pipe 62.

The simplest explanation of the shaft furnace-based direct reduction plant of the Midrex method in operation starts with the entry of the hot reducing gas through the bustle system 24 at the periphery of the reduction zone 26. The iron oxide burden 16 descends through the reduction zone 26 while the reducing gas ascends from the bottom of the reducing zone 26 through the iron oxide burden 16, reducing the burden 16 in the process, and exiting the shaft furnace 12 through an off-take 28 above stockline 64 of the burden 16. The reducing gases can be externally generated or result from reactions within the shaft furnace 12.

The metallized iron 16 then descends through the furnace transition zone 66 to the cooling zone 38 and to the discharge zone 110, which may result in either a hot or cold product, depending on the equipment installed. Additionally, the iron bearing material 16 can be further reacted with hydrocarbon gases in either the transition zone 66 or the cooling zone 38 to increase the carbon content of the product being discharged. This has proven to be a significant issue in steel production today. Higher carbon content in the metallized product, DRI, offers the steelmaker significant savings by substituting oxidation of carbon for electric energy in melting. The hydrocarbon gases can be and typically are added at various locations in the transition zone 66 or cooling zone 38 from fuel sources 114 and 112 respectively.

As a result of the addition of these hydrocarbon gases there is an ascending gas flow, equal to or greater than the quantity of hydrocarbon gases added, which flow up through the center of the furnace 12 all the way to the stockline 64 if no other steps are taken. This also holds true for lower seal leg gases, but they are usually very small in relative volume. The stream of reacted hydrocarbons is colder and of different quality than the reducing gases entering at the bustle 24 and results in lower burden temperatures in the central area of the furnace 12. Since temperature and quality directly affect the kinetics of reduction, the degree of metallization reached by the burden 16 descending in the central furnace area is different than that of the remainder of the furnace 12. Limiting this variation in furnace metallization is very important to the optimization of the plant. The reaction of the hydrocarbon gases is very beneficial and efficient energy wise, but the loss of metallization in the central furnace burden can be significant if it is ignored.

Figure 2:
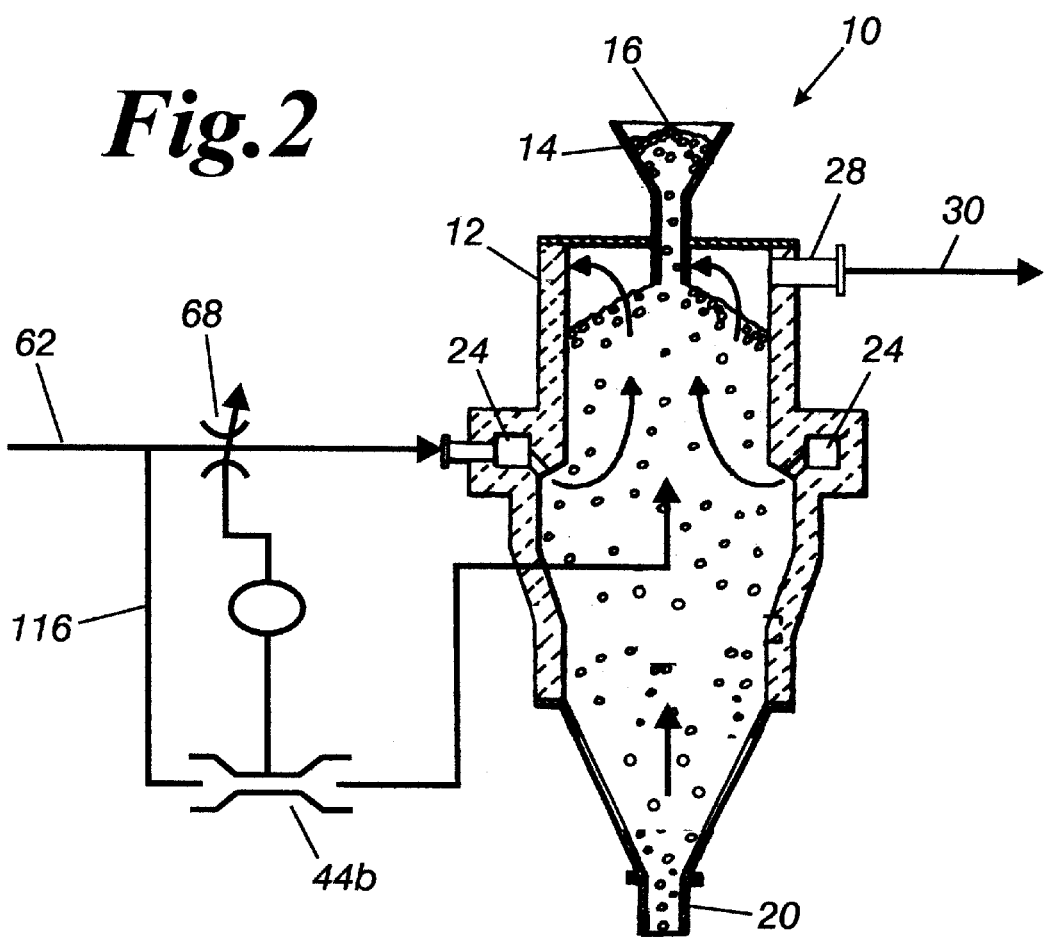
FIG. 2 is a diagram showing center injection of reducing gas split from the main reducing gas stream.
Figure 3:
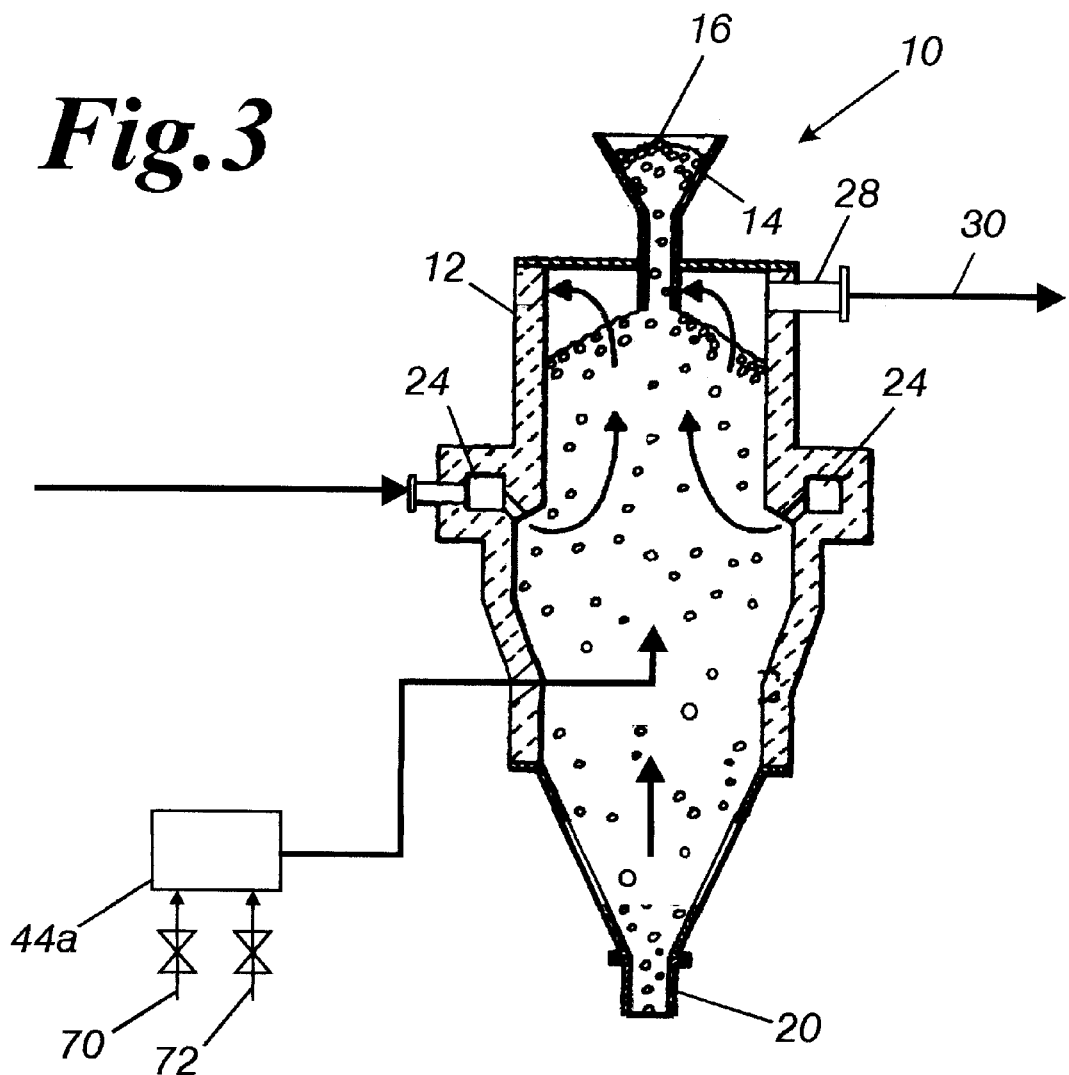
FIG. 3 is a diagram showing center injection of reducing gas produced by a partial oxidation reactor.

Generally, normal bustle gas temperature ranges from 700–1100° C. Center bed temperature, in both hot and cold discharge plants, ranges from about 600 to about 800° C. Providing a small flow of high temperature reducing gas to the center of the furnace 12 raises the center bed temperature. In typical operation of a direct reduction furnace, the bustle gas stream enters from the periphery of the furnace 12. Referring now to FIGS. 2 and 3, a preferred embodiment of the present invention is shown. The invented apparatus and method provides a means of injection of hot reducing gases into the center of a direct reduction furnace 12 so that temperature within the center of the burden 16 is maintained within a preferred range. In accordance with this invention, the hot reducing gas is ducted to the vertical centerline of the furnace 12 where it is allowed to mix with the upflowing stream of hydrocarbon cooling gases from the transition zone 66 of the furnace 12. The invented apparatus and method is applicable to shaft furnaces discharging either hot or cold metallized product. The source of the hot reducing gas may be from either a reformer 44 or a partial oxidation reactor 44(a) such as the OXY+ system as disclosed in U.S. Pat. No. 5,997,596 entitled "OXYGEN FUEL BOOST REFORMER PROCESS AND APPARATUS".

In accordance with FIG. 2, prior to entering the furnace 12, a portion of the high temperature bustle gas stream is split-off and added to the center of the furnace 12. A variable or fixed restriction device 68 is used to provide adequate pressure drop to force the bustle gas to flow through the center injection line 116. The flow rate of hot bustle gas through the center injection line 116 is preferably measured using a venturi 44(b), however, other suitable measuring means may be used.

In accordance with FIG. 3, a partial oxidation reactor 44(a) or multiple reactors generate the hot reducing gas which is then ducted to the center of the furnace 12, eliminating the need to divert a small portion of hot bustle gas to the center of the furnace 12. In general, the partial oxygen reactor 44(a) burns oxygen 70 and a hydrocarbon fuel 72 such as natural gas to produce a high quality, high temperature reducing gas. This gas is well suited to use for center injection into a direct reduction furnace 12. Since the quantity and ratio of oxygen and hydrocarbon fuel are tightly controlled for proper combustion in the oxidation reactor 44(a), the mechanism to vary the flow rate of center injection gas may easily be built into the partial oxidation reactor 44(a) design.

Figure 4:
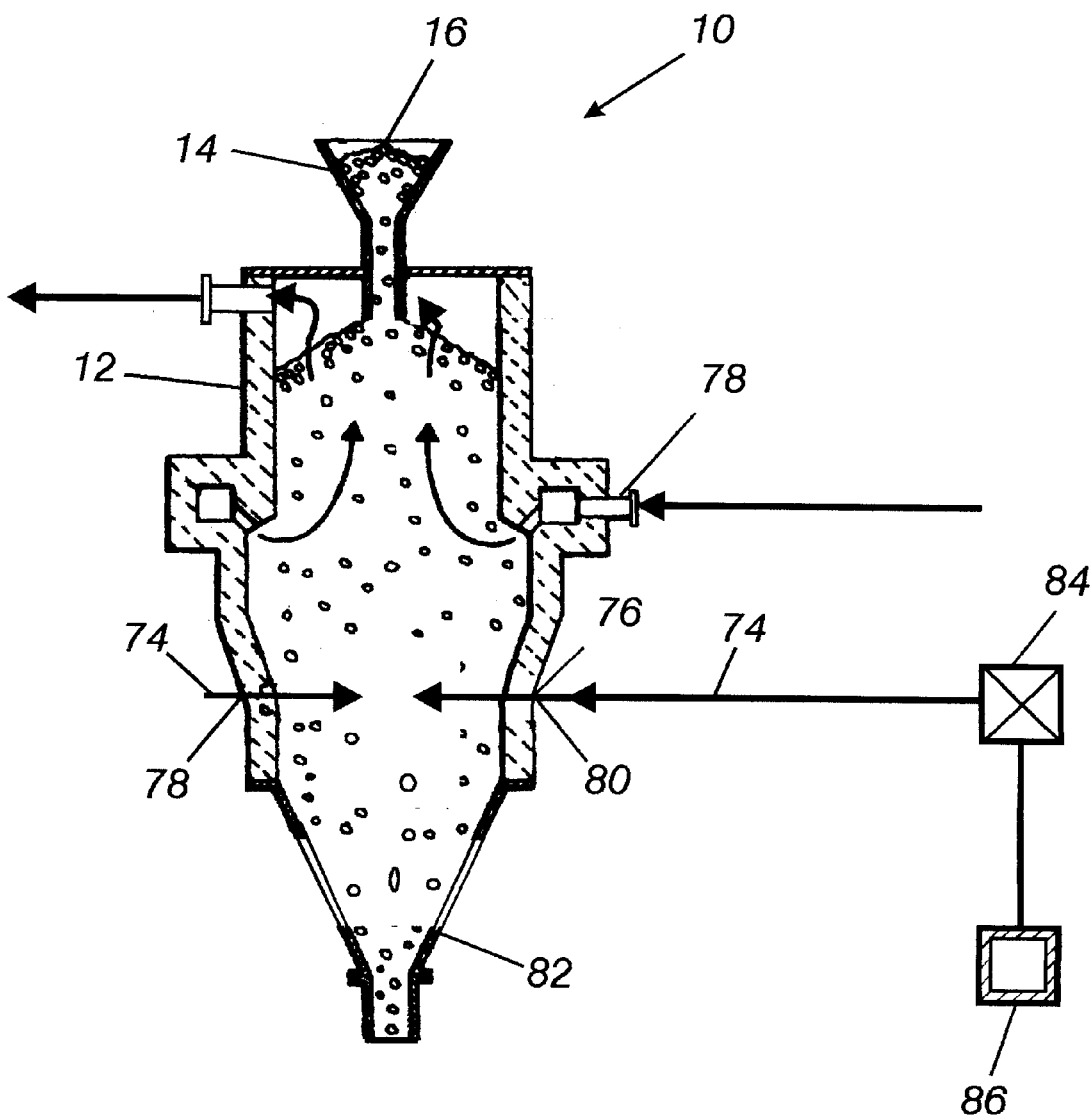
FIG. 4 is a diagram showing the entry of preheated in situ natural gas into a direct reduction furnace.

In an alternative embodiment of the invention in accordance with FIG. 4, preheated natural gas 74 is added to a plurality of nozzles 76, 78, 80, respectively, which are located around the periphery of the transition zone 66 or the discharge zone 110 and which are not used for cooling so as to increase the amount of hydrocarbons used within the lower cone 82 of the furnace 12 while maintaining an adequate center furnace temperature. This entails preheating a hydrocarbon stream and adding the preheated hydrocarbon stream to any of the plurality of nozzles 76, 78, 80 which are not used for cooling of the direct reduced iron. When preheated natural gas 74 is injected into non-cooling inlets 76, 78, 80 of the furnace 12, additional energy is shifted to the furnace 12 and uniformity of burden 16 temperatures is improved.

The apparatus includes a heat exchanger 84 to preheat the natural gas 74 before injecting it into the direct reduction furnace 12. Hot flue gas from a combustion process is supplied to the heat exchanger 84 to preheat the natural gas 74 stream. The flue gas may be from a reformer 86 or from any other source of combustion flue gases. The temperature to which the natural gas 74 is preheated is typically up to 450° C., although the temperature is only limited at the upper end by cracking of the heated gas. That is, the preheat temperature must be lower than the temperature at which cracking of the natural gas 74 would present problems with carbon deposition in the heat exchanger 84 or piping. It will be appreciated by those of skilled in the art that the preheat temperature can be as high as 550° C. depending upon the composition of the preheated gas and its tendency to crack.

Alternatively, the natural gas 74 is mixed with $H_2$, $H_2O$, $CO_2$, or any other gas that contains $H_2$, $H_2O$ and/or $CO_2$, before the preheating stage. Addition of any of these gases will decrease the partial pressure of the hydrocarbons and thus, their tendency to crack during or after preheating. The addition of $H_2$ directly decreases the tendency of hydrocarbons to crack. $H_2O$ and/or $CO_2$ directly decreases the tendency of any $H_2$ and CO to form carbon. With the addition of these gases the preheat temperature limit may be raised to 700° C.

The invented method and apparatus allows more natural gas 74 to be injected into the furnace 12 before the furnace temperatures cool to the point where any further production benefit from additional reducing gases will be negated by the decrease in reaction kinetics. Adding more natural gas 74, because it is hot, increases in-situ reforming, and cracking, thereby increasing the amount of reducing gas in the direct reduction furnace 12, which results in a higher production rate from the direct reduction furnace 12.

Figure 5:
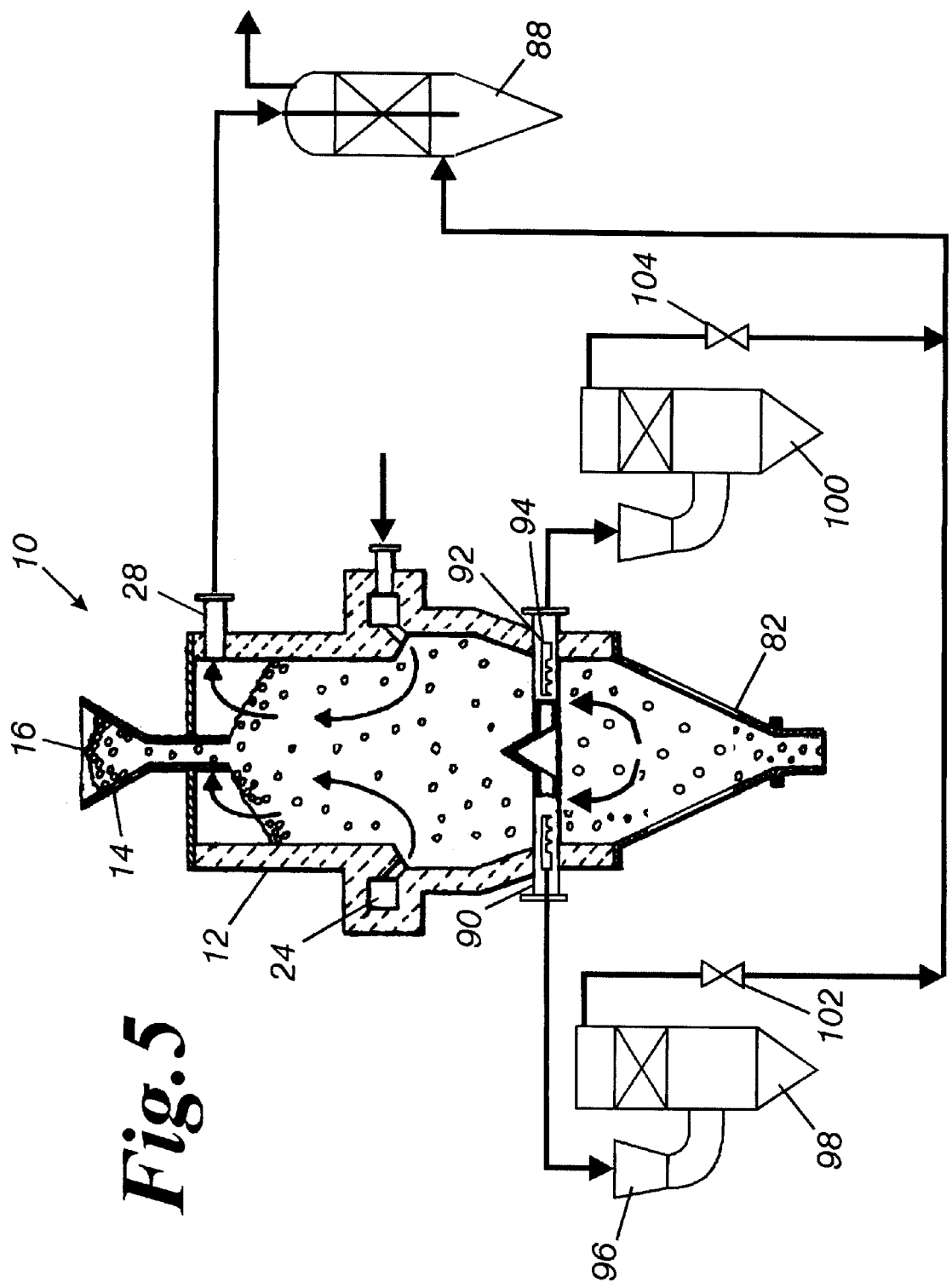
FIG. 5 is a diagram showing a hot cone bleed from a furnace with the hot cone bleed gas sent to a top gas scrubber.
Figure 6:
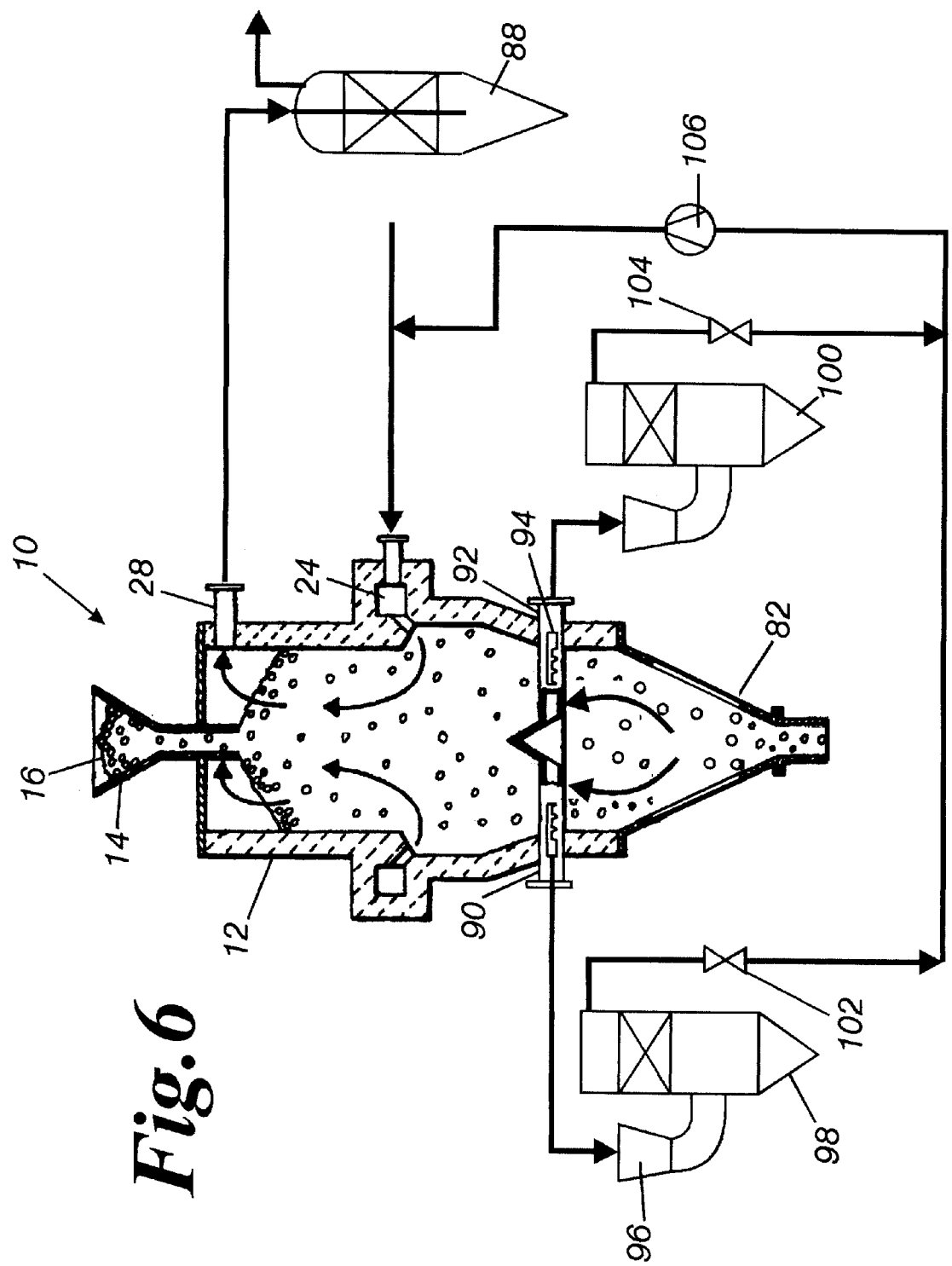
FIG. 6 is a diagram showing a hot cone bleed from a furnace with the hot cone bleed gas combined with the main reducing gas stream.

In still another embodiment of the present invention and referring to FIGS. 5 and 6, an outlet 28 is provided for the upflowing gases that cool the center of the burden 16. This technique is known as "hot cone bleeding". The upflowing gas once collected can be contained in the collected stream. This effectively redistributes the collected gas stream in the full reducing gas flow at the furnace bustle 24, eliminating its effect on the center bed.

Limiting the quantity of upflowing gas from the discharge zone 110 to the reducing zone 26 has been used for many years to limit the temperature variation or loss in the central burden 16. With a cold discharge plant, where a recirculating stream of gas is used to cool the metallized product before discharge, a method called "Cooling Zone Bleed" has been used for over 25 years to accomplish this control. The methods of bleeding have changed to take advantage of the hydrocarbon reactions from the natural gas additions to the cooling gas stream, but the basic control objective remains keeping the temperature of the central furnace burden 16 above a certain minimum. Historically, however, if a particular furnace 12 had no cooling gas recirculating stream (i.e. hot discharge), the use of a cooling zone bleed was not available.

The invented method and apparatus for providing a hot cone bleed removes upflowing gas from the transition zone 66 of the furnace 12 and reintroduces the gas, as reducing gas, to the upper section or reducing zone 26 of the furnace 12. The upflowing gas, once collected, may be injected at one or several locations in the process in order to take advantage of the reducing gases contained in the collected gas stream. Mixing the collected gas stream with the main reducing gas stream effectively redistributes the collected gas stream in the full reducing gas flow at the furnace bustle 24. Thus, the cooling effect of the gas stream is distributed throughout the furnace 12 by the main reducing gas stream, eliminating the concentrated cooling effect at the center of the furnace bed.

By reducing the amount of upflowing gas in the center of the furnace 12, higher bed temperatures are maintained, thus increasing reaction kinetics. The upflowing gas that is removed is rich in reducing gas and is recycled back to the process through either the top gas scrubber 88 of the furnace 12 or the main reducing gas stream leading to the furnace 12.

Preferably, the invented apparatus has a plurality of gas off-take pipes 90 and 92 which extend into the furnace 12 in the transition zone 66. The pipes 90 and 92 have slots or openings 94 which face downwards toward the discharge zone 110. Upflow from the discharge zone 110 is drawn through the slots 94 into the pipes 90 and 92. Once the upflow exits the furnace 12, it is referred to as hot cone bleed gas because it is removed from lower cone 82 of the furnace. The gas drawn into each pipe 90 and 92 is sent through a venturi 96 to provide some initial cooling and scrubbing. The gas then passes through quenched pack type scrubbers 98 and 100 for further cooling and scrubbing. Flow control valves 102 and 104, located downstream from the scrubbers 98 and 100, control the flowrate of gas exiting the scrubbers 98 and 100, and therefore control the amount of gas drawn into pipes 90 and 92 from the cooling zone 38 of the furnace 12.

The cool and clean hot cone bleed gas can be returned to the furnace 12 in one of two locations. As shown in FIG. 5, the hot cone bleed gas can be routed to the top gas scrubber 88 of the furnace 12 so that the gas is injected underneath the packing of the scrubbers 98 and 100, similar to process gas recycle. The hot cone bleed gas exiting the furnace 12 is at a higher pressure than the top gas scrubber 88, so the system is natural flow. Alternatively, as shown in FIG. 6, the cool and clean hot cone bleed gas can be compressed by a compressor 106 and delivered directly to a bustle gas duct 24 for injection into the furnace reduction zone 26.

Since hot cone bleed can be adjusted to control the amount of gas upflow, it allows more hydrocarbons to be added to the lower cone 82 of the furnace 12. The amount of hot cone bleed can be increased as hydrocarbons to the lower cone 82 are increased. The additional amount of hydrocarbons to the lower cone 82 will increase product carbon and generate more reducing gas, mostly $H_2$, without lowering center bed temperatures which reduces reaction kinetics.

Because the hydrocarbons added to the lower portion of the furnace 12 cools the reduced iron product, the quantity and composition of added gases will still be limited by the minimum allowable temperature of the output product, which is around 650–700° C. for a furnace producing hot briquetted iron (HBI).

It will be appreciated by those of ordinary skill in the art that any one of these embodiments may be employed, either individually or jointly, to accomplish the goals stated herein.

SUMMARY OF THE ACHIEVEMENT OF THE OBJECTS OF THE INVENTION

From the foregoing, it is readily apparent that we have invented an improved method and apparatus for controlling the temperature of the center burden of a direct reduction furnace; that allows the use of higher quantities of hydrocarbons or other gases within the lower portion of both hot and cold discharge furnaces so that product carbon and/or in-situ reforming is increased; which conserves energy in a Direct Reduction furnace by maintaining a uniform temperature therein; which provides control options to DRI plant operators to allow significantly higher levels of hydrocarbon gas additions, while reducing the temperature variations across the burden; that offsets the cooling effect caused by rising upflowing gas into the reduction zone of the furnace, thereby increasing metallization of the burden.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An apparatus for controlling temperature uniformity of the burden in a furnace for direct reduction of iron oxides to a metallized iron product, comprising:

a generally vertical shaft furnace having an upper charging end and a bottom discharge end;

means for charging particulate iron oxide material to the upper end of said furnace to form a burden therein, and a means for removing metallized iron product from the bottom end of said furnace, whereby a continuous gravitational flow of said burden can be established through the furnace;

a reacted gas outlet at the upper end of said furnace;

a first hot reducing gas inlet means through which a hot reducing gas is injected into the burden, said hot reducing gas inlet means located between the upper end of said furnace and the bottom of said furnace, wherein said hot reducing gas is injected into the burden to reduce the burden to metallized iron; and a second hot reducing gas inlet means through which a hot reducing gas is injected into a vertical centerline of the furnace to offset a cooling effect of upflowing gases, said second reducing inlet means intermediate to said first reducing inlet means and said bottom of said furnace.

2. The apparatus according to claim 1 wherein the first hot reducing gas inlet means is a bustle and tuyere system.

3. The apparatus according to claim 1 wherein the second hot reducing gas inlet means comprises an associated reformer for providing the reducing gas prior to injection into the furnace.

4. The apparatus according to claim 1 wherein the second hot reducing gas inlet means comprises a partial oxidation reactor for providing the reducing gas prior to injection into the furnace.

5. A method for controlling temperature uniformity of the burden in a furnace for the direct reduction of iron oxides comprising the steps of:

charging particulate iron oxide material to a generally vertical shaft furnace to form a burden therein;

injecting a hot reducing gas from a first hot reducing gas inlet means located intermediate to the ends of said furnace, wherein said reducing gas reduces the charged particulate iron oxide material;

injecting a hot reducing gas from a second hot reducing gas inlet means into the center of said burden to offset a cooling effect of upflowing gases; and removing metallized iron product from bottom of said furnace thereby establishing a continuous gravitational flow of said burden through said furnace.

6. The method according to claim 5 wherein said second hot reducing gas inlet means comprises a reformer for providing the hot reducing gas prior to injection into said furnace.

7. The method according to claim 5 wherein said second hot reducing gas inlet means comprises a partial oxidation reactor for providing said hot reducing gas prior to injection into said furnace.

8. A method for controlling temperature uniformity of the burden in a furnace for the direct reduction of iron oxides comprising the steps of:

charging particulate iron oxide material to a generally vertical shaft furnace to form a burden therein;

injecting a hot reducing gas into said burden from at least one reducing gas inlet system, said reducing gas inlet system being located intermediate to an upper end and a lower end of said furnace;

injecting a preheated natural gas to said burden for offsetting a cooling effect in the burden caused by upflowing gas, said natural gas being injected below the hot reducing gas inlet system; and removing metallized iron product from bottom of said furnace thereby establishing a continuous gravitational flow of said burden through said furnace.

9. The method according to claim 8 wherein said natural gas is preheated by a heat exchanger prior to injection into said furnace.

10. The method according to claim 8 wherein said natural gas is mixed with $H_2$, $H_2O$, or $CO_2$ prior to the preheating step.

11. An apparatus for controlling temperature uniformity of the burden in a furnace for direct reduction of iron oxides to a metallized iron product, comprising:

a generally vertical shaft furnace;

means for charging particulate iron oxide material to an upper end of said furnace to form a burden therein, and a means for removing metallized iron product from a bottom end of said furnace, whereby a continuous gravitational flow of said burden can be established through the furnace;

at least one reducing gas inlet means comprising a bustle and tuyere through which reducing gas is injected into the burden, said reducing gas inlet means located intermediate to the ends of the furnace;

a natural gas preheating means communicably linked to a plurality of nozzles, through which a preheated natural gas is added to said burden for offsetting a cooling effect in the burden caused by upflowing gas; and a reacted gas outlet at the upper end of said furnace.

12. The apparatus according to claim 11, wherein said natural gas preheating means comprises a heat exchanger, and a plurality of pipes for ducting the gases disposed therebetween.

13. The apparatus according to claim 11, further comprising a means for mixing $H_2$, $H_2O$, or $CO_2$ with the natural gas prior to said natural gas being pre-heated.

14. A method for controlling temperature uniformity of the burden in a furnace for the direct reduction of iron oxides comprising the steps of:

charging particulate iron oxide material to a generally vertical shaft furnace to form a burden therein;

injecting a hot reducing gas from at least one hot reducing gas inlet system into said burden, said reducing gas inlet system being located intermediate the upper end and a lower end of said furnace;

removing a portion of the upflowing gas from said burden for offsetting a cooling effect of upflowing gas by a removing means located below said at least one hot reducing gas inlet system and said bottom end of said furnace;

scrubbing the removed upflowing gas to create a scrubbed gas;

circulating said scrubbed gas through a plurality of pipes to said reducing gas inlet system;

reintroducing said scrubbed gas as recycled reducing gas into said furnace through said reducing gas inlet system; and removing metallized iron products from the bottom of said furnace thereby establishing a continuous gravitational flow of said burden through said furnace.

15. The method according to claim 14, wherein said removing gas means comprises at least one pipe disposed within said furnace having a plurality of slots for collecting said upflowing gas and routing the gas from the furnace to a scrubber.

16. The method according to claim 14, wherein said circulating step further includes the step of circulating the removed upflow gas to a top gas scrubber for further scrubbing prior to the circulation to said reducing gas inlet system.

17. An apparatus for controlling temperature uniformity of the burden in a furnace for direct reduction of iron oxides to a metallized iron product, comprising:

a generally vertical shaft furnace;

means for charging particulate iron oxide material to an upper end of said furnace to form a burden therein, and a means for removing metallized iron product from a bottom end of said furnace, whereby a continuous gravitational flow of said burden can be established through the furnace;

a hot reducing gas inlet system through which a hot reducing gas is injected into the burden, said reducing gas system located intermediate to said upper and bottom end of said furnace;

a removal system for collecting and removing a portion of the upflow gas to offset a cooling effect of upflowing gas, said removal system being disposed between said reducing gas inlet system and said bottom end of said furnace;

at least one scrubber linked to said removal system for scrubbing said upflow gas;

a plurality of pipes connected to said reducing gas inlet system for reintroduction of said upflow gas into said furnace after said gas is scrubbed; and a reacted gas outlet at the upper end of said furnace.

18. The apparatus according to claim 17, further comprising a top gas scrubber is disposed between said at least one scrubber and said reducing gas inlet system for further scrubbing of said upflow gas prior to reintroduction into said furnace.

19. The apparatus according to claim 17, wherein said removal system comprises at least one pipe disposed within said furnace having a plurality of slots for collecting said upflowing gas and routing the gas from the furnace to said at least one scrubber.

* * * * *